6673X
J. Bolton.
Grain Screen.
Patented Jul. 28, 1831.
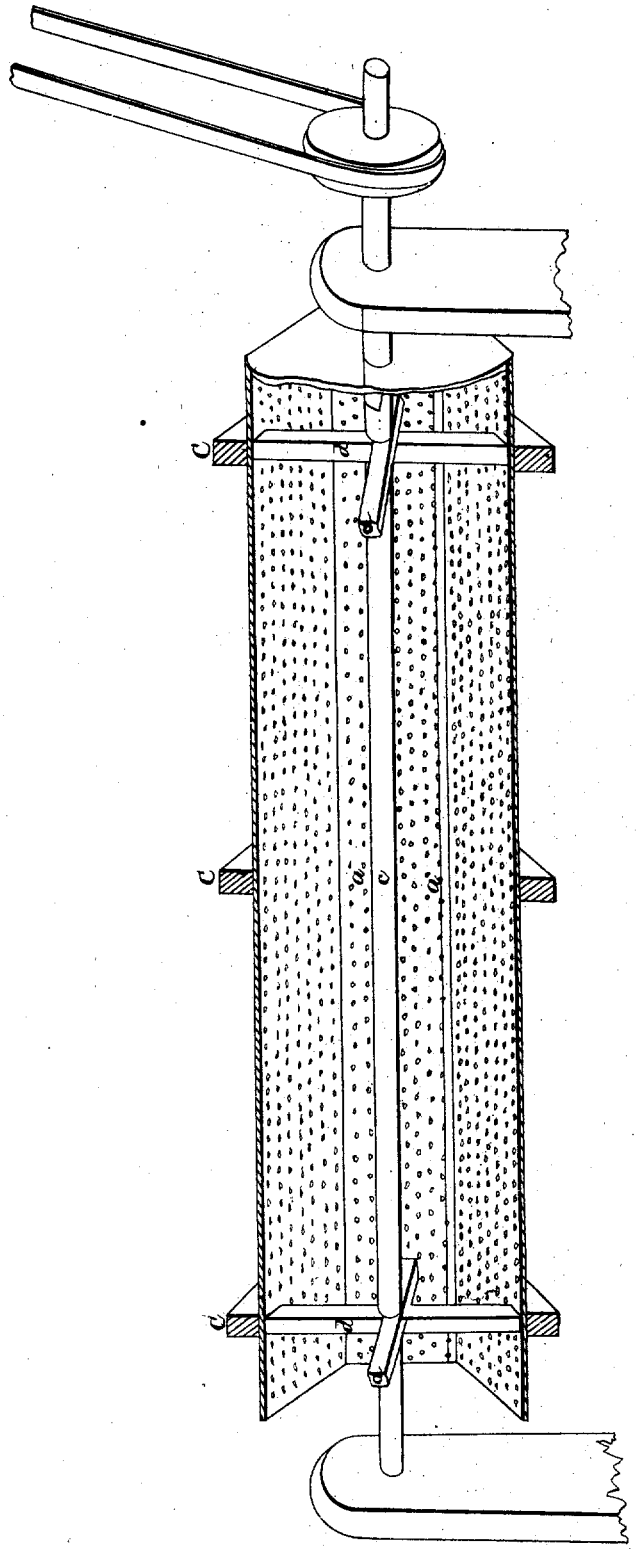
N. PETERS, PHOTO-LITHOGRAPHER, WASHINGTON, D. C.

John Bolton Dauphin Penn 6673X

Letters Patent

The Schedule referred to in these Letters Patent and making part of the same containing a description in the words of the said John Bolton himself of his improvement in the mode of making and constructing a bell for separating Clover Chaff from the Straw at an operation.

To all persons to whom these presents shall come John Bolton in the County of Dauphin & State of Pennsylvania, (Millwright) sends greeting: Be it known that I the said John Bolton have invented, constructed made & applied to use a new and useful improvement in a Bell for Separating the Straw from the Chaff in Clover Seed Mills Specified in the words following viz This improvement in the Bell is made of Pine boards say three eighths of an inch thick, & from ten to twelve feet long. It can be made round or any number of squares but six squares is much the best, with a shaft through the the centre to turn on, with two arms put through said shaft at one foot from each end.

The bell is to have three ribs or frames around it on the outside the two outer ones one foot from each end, & the other in the Centre. The bell can be made any size from two feet and one half to three feet diameter, or say each one of the six squares about one foot four inches to one foot six inches wide & the outside covering or boards to be bored every inch & a half square with a hole five eighths or three fourths of an inch so as to let the chaff pass through & the straw passout at the end of said Bell And said Bell can be turned by a strap or any other machinery at the rate of about twenty five or thirty revolutions per minute. The lower or tail end to be placed about six inches lower than the head end so as to raise or fall. The said Bell can be made of wire or basket splits In testimony that the above is a true specification of my said improvement as above described I have hereto set my hand and seal this twentieth day of June AD one thousand eight hundred and thirty one.

Witnesses
Jas Wilson [illegible]
[illegible]

John Bolton

Exd
[illegible]

416 [illegible]

[illegible]